(12) United States Patent
Westhafer et al.

(10) Patent No.: US 9,529,855 B2
(45) Date of Patent: Dec. 27, 2016

(54) SYSTEMS AND METHODS FOR POINT OF INTEREST DATA INGESTION

(71) Applicant: MapQuest, Inc., Denver, CO (US)

(72) Inventors: Bryan C. Westhafer, Reinholds, PA (US); Philip Russo, Littleton, CO (US); Marshall B. Matthews, Mountville, PA (US); Antony M. Pegg, East Petersburg, PA (US)

(73) Assignee: MapQuest, Inc., Denver, CO (US)

( * ) Notice: Subject to any disclaimer, the term of this patent is extended or adjusted under 35 U.S.C. 154(b) by 664 days.

(21) Appl. No.: 13/836,903

(22) Filed: Mar. 15, 2013

(65) Prior Publication Data

US 2014/0280085 A1  Sep. 18, 2014

(51) Int. Cl.
*G06F 17/30* (2006.01)
(52) U.S. Cl.
CPC ..... *G06F 17/3053* (2013.01); *G06F 17/30241* (2013.01)
(58) Field of Classification Search
CPC ................ G06F 19/3443; G06F 19/322; G06F 17/30371; G06F 17/30286; G06F 17/30595
See application file for complete search history.

(56) References Cited

U.S. PATENT DOCUMENTS

| | | | |
|---|---|---|---|
| 5,819,291 A * | 10/1998 | Haimowitz et al. | |
| 2006/0129896 A1* | 6/2006 | Rohn | G06Q 40/02 714/49 |
| 2008/0310736 A1* | 12/2008 | Chattopadhyay | G06F 11/3692 382/218 |
| 2010/0082362 A1* | 4/2010 | Salsbury et al. | 705/1.1 |
| 2010/0211532 A1* | 8/2010 | Irion et al. | 706/11 |
| 2011/0010401 A1* | 1/2011 | Adams et al. | 707/805 |

* cited by examiner

*Primary Examiner* — Angelica Ruiz
(74) *Attorney, Agent, or Firm* — Finnegan, Henderson, Farabow, Garrett & Dunner, LLP (57) ABSTRACT

Systems and methods are disclosed for ingesting data, such as point of interest data. According to certain embodiments, a raw data load transmitted over a network is received from a first data source. The raw data load may comprise a plurality of raw data records, which may be stored in a first database. A first plurality of standard data records previously received from the first data source may be accessed and compared to each of the plurality of raw data records to identify at least one added record. The at least one added record may be compared to a second plurality of standard data records received from a second data source to identify a matching record received from the second data source. The at least one added record may be assigned a key from the matching record. Moreover, the updated information may be sent to an update queue, such that applications may be notified of and receive the updates.

27 Claims, 5 Drawing Sheets

SYSTEMS AND METHODS FOR POINT OF INTEREST DATA INGESTION

BACKGROUND

Technical Field

The present disclosure generally relates to the field of electronic mapping and to computerized data processes, including point of interest data. More specifically, and without limitation, the exemplary embodiments described herein relate to systems and methods for ingesting point of interest data and efficiently combining the data with previously stored point of interest data to provide more complete point of interest information to end users.

Background

In addition to maps and directions, online web mapping services may provide a variety of other useful information to their users, such as point of interest. Among other things, points of interest may include hotels, restaurants, amusement parks, sports facilities, universities, parks, etc. To enhance a user's experience with these points of interest, an online mapping service may provide detailed information about each point of interest, including services associated with the point of interest. For example, point of interest information for a restaurant may include location, cuisine type, description, menus, ratings, and user reviews, among other types of information. Further, the online web mapping service may also provide services associated with the restaurant, such as directions or reservations.

Point of interest information may come from various sources, such as users and third-party vendors. Some point of interest information may originate in-house (e.g., prepared by the online web mapping service). Regardless of the source, when a mapping service receives the point of interest information, it must process it so that the information may be delivered to third-party users and/or other users of the mapping service.

Current systems of ingesting point of interest data merge data from each data source (e.g., each vendor) to obtain one data set. For example, the data received from vendors may be merged with one another, and with previously received point of interest data, on a periodic basis, such as three times a week (e.g., Monday, Wednesday, and Friday). Whereas only some of the new point of information may represent a change from previous information, conventional systems process this redundant data along with new data as part of the merge process.

Moreover, different data sources may provide different types of point of interest information. Current data ingestion systems designate a standard set of data points and collect only the information related to these data points, discarding the rest. For example, one vendor may provide an address, telephone number, rating, and cuisine type for a restaurant, and another vendor may provide an address, telephone number, images, menus, and user reviews for the restaurant. Mapping services and vendors may only store address, telephone number, rating, and user review information, thus the cuisine type, images, and menu information will be discarded.

As discussed above, conventional techniques for ingesting or processing point of interest data suffer from drawbacks or disadvantages that affect their ability to efficiently provide information to third-party users and other users. For example, by merging all point of interest data received from a vendor in a current upload, rather than just the data that is unique from previously received or other point of interest data, conventional data ingestion systems waste significant processing resources. Moreover, as discussed above, current systems simply discard potentially valuable point of interest information when that information does not fit within statically defined parameters or other standard parameters. Yet, this information may have uses for third-party users of online mapping services that may not have been apparent at the time the standard parameters were defined.

SUMMARY

Consistent with the present disclosure, systems and methods are provided for processing point of interest data. Embodiments consistent with the present disclosure include computer-implemented systems and methods for ingesting point of interest data from multiple sources. In addition, systems and methods consistent with the present disclosure may process point of interest data such that all ingested data is efficiently merged and made available for users, including third party users and other users. Embodiments consistent with the present disclosure may overcome one or more of the drawbacks or problems set forth above.

In accordance with one exemplary embodiment, a computerized method is provided for ingesting data with one or more processors. According to the method, a raw data load may be transmitted over a network and received from a first data source. This raw data load may include a plurality of raw data records. The plurality of raw data records may be stored in a database. The method also includes accessing a first plurality of standard data records previously received from the first data source and performing a first comparison of records with at least one processor. This first comparison may include comparing each of the plurality of raw data records to each of the first plurality of standard data records. The method further includes identifying at least one added record based on the first comparison. Moreover, the method includes performing a second comparison of records with at least one processor. The second comparison includes comparing the at least one added record to each of a second plurality of standard data records received from a second data source. Based on the second comparison, a matching record received from the second data source may be identified. The method further includes assigning a key from the matching record to the at least one added record.

In accordance with another exemplary embodiment, a system is provided for ingesting data. The system includes a database and at least one processor in communication with the database. The processor is configured to perform several steps for ingesting data, including receiving a raw data load transmitted over a network from a first data source. The raw data load may comprise a plurality of raw data records. The plurality of raw data records may be stored in the database. The steps also include accessing a first plurality of standard data records previously received from the first data source and performing a first comparison of records. This first comparison may include comparing each of the plurality of raw data records to each of the first plurality of standard data records. Based on the first comparison, at least one added record may be identified. The processor is further configured to perform a second comparison of records. The second comparison may include comparing the at least one added record to each of a second plurality of standard data records received from a second data source. Based on the second comparison, a matching record received from the second data source may be identified. The processor may also be configured to assign a key from the matching record to the at least one added record.

In accordance with yet another exemplary embodiment, a computer readable storage medium is provided including a set of instructions for ingesting data. When executed, the set of instructions may cause at least one processor to perform steps for receiving a raw data load transmitted over a network from a first data source. The raw data load may include a plurality of raw data records. The instructions may further cause the processor to store the plurality of raw records in a first database. The steps performed by the processor also include accessing a first plurality of standard data records previously received from the first data source and performing a first comparison of records. The first comparison may include comparing each of the plurality of raw data records to each of the first plurality of standard data records. The steps performed by the processor also include identifying at least one added record based on the first comparison. The instructions also cause the processor to perform a second comparison of records. The second comparison includes comparing the at least one added record to each of a second plurality of standard data records received from a second data source. Further, the instructions cause the processor to identify a matching record received from the second data source. Moreover, the at least one added record is assigned a key from the matching record.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION OF EXEMPLARY EMBODIMENTS

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Embodiments of the present disclosure provide improved systems and methods for ingesting data, including point of interest data, such as that used by an online web mapping service. The disclosed embodiments also provide improved systems and methods for merging data received from various sources with previously received data. Moreover, the disclosed embodiments store all received data, such that it may be used by third-party and other users to suit those users' personal and/or business needs.

In certain embodiments, systems and methods are provided for ingesting data, such that data received from different sources is compared to identify new or modified data elements or sets. For example, a point of interest data feed from one vendor may be compared against previous feeds from the vendor as well as previous and/or new feeds from other vendors to determine whether information pertaining to a subset of points of interest is new or represents a change from other information received for those points of interest. The data feed may also be analyzed to determine whether any points of interest no longer exist. Any new information may be added to a database, such that third-party users and other users may have up-to-date information regarding the points of interest. By first evaluating data feeds to identify instances in which point of interest information should be added, modified, or deleted, rather than assuming that all information should overwrite previously stored information, point of interest information from various sources may be more efficiently ingested and merged.

Among other features and advantages, the disclosed embodiments include storing values pertaining to all fields in a data feed. As discussed above, in prior data ingestion systems, only a subset of standard data received from a data feed was stored and made available to third-party and end users. In contrast, certain disclosed embodiments store information pertaining to all data fields included in a data feed. Thus, if an online web mapping service only wants to use a subset of the received data for its own web mapping application, it may do so, but other third-party users of this data, for example, may pick and choose which data they want to use from the entire set of received data, rather than the subset used by the online web mapping application.

Figure 1:
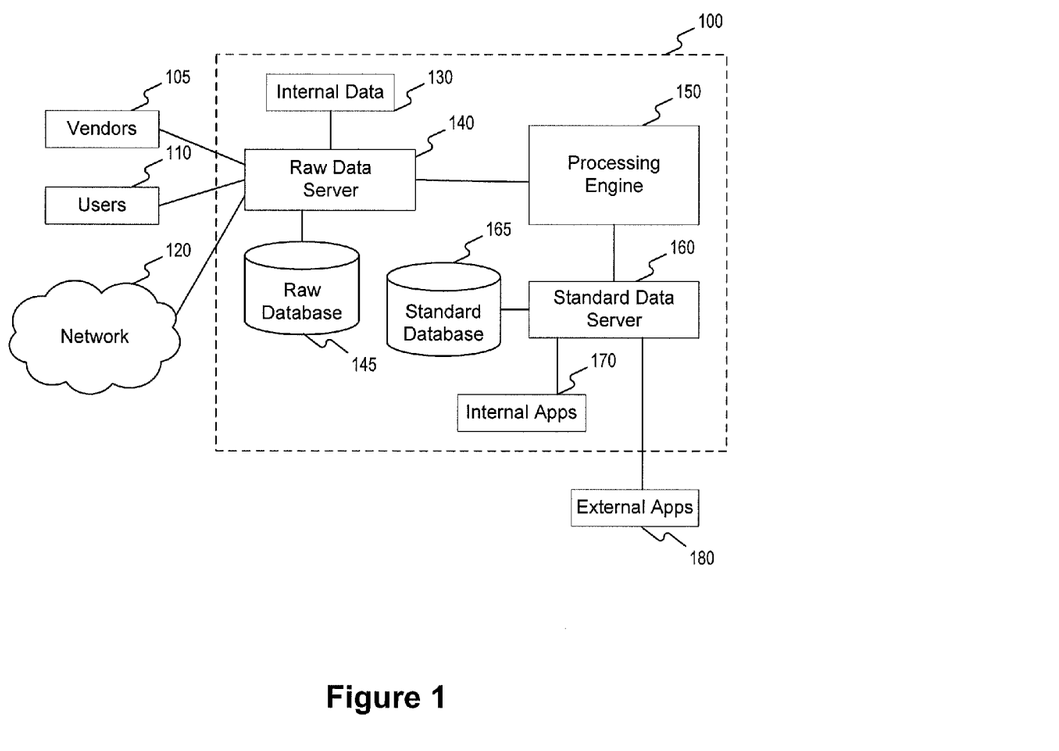
FIG. 1 is a diagram of an exemplary system environment for implementing embodiments consistent with the present disclosure.

FIG. 1 depicts an exemplary system environment for implementing embodiments of the present disclosure. The exemplary embodiment of FIG. 1 includes a system 100. System 100 may include one or more server systems, databases, and/or computing systems configured to receive information from entities in a network, process the information, and communicate the information with other entities in the network. In one embodiment, system 100 may include internal data 130, raw data server 140, raw database 145, processing engine 150, standard data server 160, standard database 165, and internal applications 170, all of which are illustrated in a region bounded by a dashed line for system 100 in FIG. 1.

Further, in one embodiment, system 100 may transmit and/or receive data to/from various other components, such as vendors 105, users 110, electronic network 120, and external applications 180. More specifically, system 100 may be configured to receive and store raw data transmitted over an electronic network 120 (e.g., comprising the Internet) from various data sources; analyze raw data against previously received standard data; add, modify, and delete standard data records based on this analysis; and forward updated records to one or more applications.

The various components of system 100 may include an assembly of hardware, software, and/or firmware, including a memory, a central processing unit ("CPU"), and/or a user interface. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

As described above, system 100 may be configured to receive data over an electronic network 120, process/analyze the data to identify new, modified, and deleted information, and forward updates to the to one or more applications. For example, system 100 may receive data from external sources, such as vendors 105, users 110, or elsewhere on electronic network 120. The received data may include, among other things, point of interest data. In addition to vendors 105 and users 110, system 100 may include or interact with other sources (not shown in FIG. 1) to obtain electronic content over electronic network 120, in accordance with the embodiments disclosed herein.

In accordance with certain embodiments, system 100 may include a raw data server 140, which may be configured to receive data from vendors 105, users 110, and/or other external sources, such as servers on electronic network 120 or other sources communicating through electronic network 120. In addition to these external data sources, system 100 may also include an internal data server 130 from which raw data server 140 may receive data. In one embodiment, raw data server 140 may pre-process the received data and store the pre-processed data in raw database 145. Alternatively, raw data server 140 may send the received data to processing engine 150 for pre-processing. In such embodiments, processing engine 150 may send the pre-processed data back to raw data server 140 for storage in raw database 145. Raw database 145 may be any suitable type of large scale data storage device, which may optionally include any type or combination of slave databases, load balancers, dummy servers, firewalls, back-up databases, and/or any other desired database components.

In accordance with certain embodiments, processing engine 150 may comprise a Hadoop cluster including a Hadoop distributed file system ("HDFS") that is configured to stage input data, perform data processing, and store large-volume data output. It will be appreciated that the HDFS may include any desired number or arrangement of clustered machines, as needed to provide suitable efficiency, storage space, and/or processing power. It will be appreciated that any type of distributed processing system may be used in addition or in the alternative to a Hadoop cluster.

In accordance with certain embodiments, processing engine 150 may be configured to process the information received at raw data server 140 from vendors 105, users 110, electronic network 120, and internal data source 130. In one embodiment, processing engine 150 first performs pre-processing of the data. For example, processing engine 150 may convert raw data received by raw data server 140 into an internal format appropriate to facilitate comparison and/or merger of new information with previously stored information and create a hash code (e.g., MD5 hash code) for each record in the received data feed. Alternatively, as discussed above, raw data server 140 may perform this pre-processing. As discussed above, the pre-processed data may be stored in raw database 145.

Processing engine 150 may then compare the data in raw database 145 with previously received data from the same feed stored in standard database 165 to determine whether the pre-processed raw data corresponds to new points of interest, modified point of interest data, or deleted points of interest. As with raw database 145, standard database 165 may be any suitable type of large scale data storage device, which may optionally include any type or combination of slave databases, load balancers, dummy servers, firewalls, back-up databases, and/or any other desired database components. In one embodiment, raw database 145 and standard database 165 may be combined into one database. In some embodiments, newly received data may be stored separately (e.g., in separate tables) from previously received (i.e., standard) data.

When the comparison reveals that records for points of interests from that feed appear in the standard database 165, but not in raw database 145, the records from the same feed for those points of interest may be deleted from standard database 165. When the comparison reveals that records for points of interests appear in raw database 145, but do not appear for the same feed in standard database 165, the records may be standardized and added to standard database 165. When the comparison reveals that records for points of interest exist for that feed in both the raw database 145 and standard database 165, but the records are different in these two databases, the modified records stored in raw database 145 may be standardized and then used to modify or overwrite the corresponding records stored in standard database 165. In one embodiment, standardization of records may be performed by processing engine 150. In an alternative embodiment, standard server 160 may standardize records corresponding to added or modified point of interest information.

In order to determine the appropriate identifier to assign to new points of interest, processing engine 150 may compare the standardized records for the new points of interest to the standardized records for candidate points of interests received from other data feeds. For example, if processing engine 150 determines that the information received from vendor A includes a new point of interest that has never been included in any of vendor A's previous data uploads, processing engine 150 may determine whether vendor B has submitted information relating to that point of interest, so that the new record corresponding to vendor A's information for that point of interest may have the same unique identifier as the record corresponding to vendor B's information for that point of interest. Accordingly, if a point of interest is new to feed A, but not new to one or more other feeds, the identifier assigned to that record in the one or more other feeds may be used when that information is stored in standard database 165 for feed A. If the point of interest is new across all feeds (i.e., no vendor has provided any information about the point of interest), a new identifier may be created to identify this and all future records pertaining to the point of interest.

Standard data server 160 may provide data to one or more applications, such as internal applications 170 and external applications 180. Among other things, internal applications 170 and external applications 180 may include online web mapping applications, phone directories, travel applications, etc. According to certain embodiments, internal applications 170 and external applications 180 may communicate with standard data server 160 to specify which points of interest (e.g., all businesses, hotels, restaurants) and/or data fields (e.g., name, address, phone number, ratings) those applications are interested in receiving from standard data server 160. As discussed in more detail below, internal applications 170 and external applications 180 may be implemented, for example, in the form of a web page, script, plug-in, applet, feed, or mobile application, as well as in any other method for displaying electronic content to a user.

It will be appreciated that any suitable configuration of software, processors, and data storage devices may be selected to carry out the embodiments of system 100. The software and hardware associated with system 100 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

In accordance with certain embodiments, the components of system 100, such as raw data server 140, processing engine 150, and standard data server 160, may perform various methods for ingesting data, such as point of interest data. Point of interest data may come from a variety of sources, such as vendors, business partners, users, or internal sources. Vendors may include companies that provide detailed information for a large number of points of interest of various types. Exemplary vendors may include Localeze, NavTeq, CityGrid, and OPIS, among others. Point of interest data may also be obtained from business partners, such as business participating in a biz locator/partner data program. In one embodiment, point of interest data is obtained from end users of online web mapping services. For example, users may provide reviews for existing points of interest or submit data pertaining to points of interest for which the online web mapping service has not yet received data. Point of interest data may also come from internal sources, such as an internal editor or team of editors associated with the online web mapping service. In one embodiment, vendors and other data sources submit information to an online web mapping service using a trusted partner API, such as Yext or Vibe Places.

According to certain embodiments, the data received from a single data source (e.g., a single vendor) is referred to as a data feed. Further, each data source may submit new or updated point of interest data to an online web mapping service as often as it deems appropriate or otherwise on a periodic basis. Thus, an online web mapping system may receive a data load from the same data source quarterly, monthly, daily, or even multiple times per day. Yet, each of these data loads is considered part of the same data feed.

Point of interest data may be transferred using several different formats, such as CSV, XML, or any other database loading formats. Moreover, the data may be transmitted using one of several different methods, such as SCP, FTP, or HTTP. One of ordinary skill would understand that any other suitable networking protocol may be used, as appropriate. In one embodiment, an online web mapping service may provide a questionnaire to data sources, so that the data sources are aware of the ingestion requirements of the online web mapping service. For example, the questionnaire may contain information regarding the appropriate format for sending point of interest information (e.g., CSV) and acceptable transfer protocols for uploading the information (e.g., SCP). This may enable the ingestion process to flow more smoothly.

Figure 2:
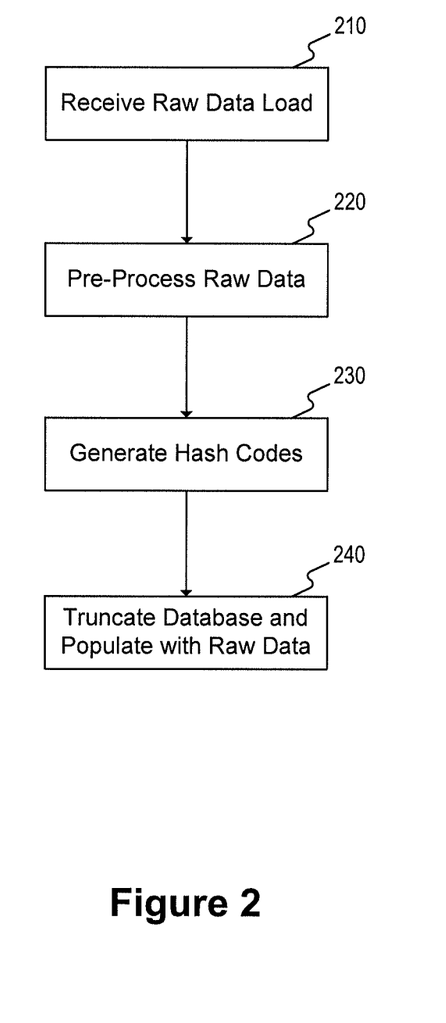
FIG. 2 is a flow diagram depicting exemplary steps of a first process for ingesting data, in accordance with an embodiment of the present disclosure.

FIG. 2 depicts an exemplary flow of a first process for data ingestion, in accordance with an embodiment of the present disclosure. The steps associated with this exemplary process may be performed by the components of FIG. 1. For example, the steps associated with the first process may be performed by raw data server 140, raw database 145, and/or processing engine 150.

In step 210, raw data is received from a data source. In one embodiment, raw data may be received at raw data server 140. As discussed above, the raw data may be provided in any form suitable for loading into a database, such as CSV or XML. This data may be pre-processed in step 220 to remove bad data, split data into multiple files, or combine multiple files into one, as appropriate. The pre-processing of step 220 may also include converting the raw data into an internal format, such as a proprietary XML format used by the online web mapping service. A hash code (e.g., an MD5 hash code) may be generated for and associated with each record of the data load in step 230. In one embodiment, the receipt, pre-processing, and hashing of data is performed by a server, such as raw data server 140. Alternatively, these steps may be performed by processing engine 150.

In step 240, a database table associated with the data feed is truncated and populated with the raw data (or pre-processed raw data) and the hash codes generated for each record. In one embodiment, this table is stored in raw database 145. Further, in one embodiment, raw database 145 may store in separate tables raw data received from all incoming feeds. In an alternative embodiment, each feed may store raw data in a separate, dedicated database.

Figure 3:
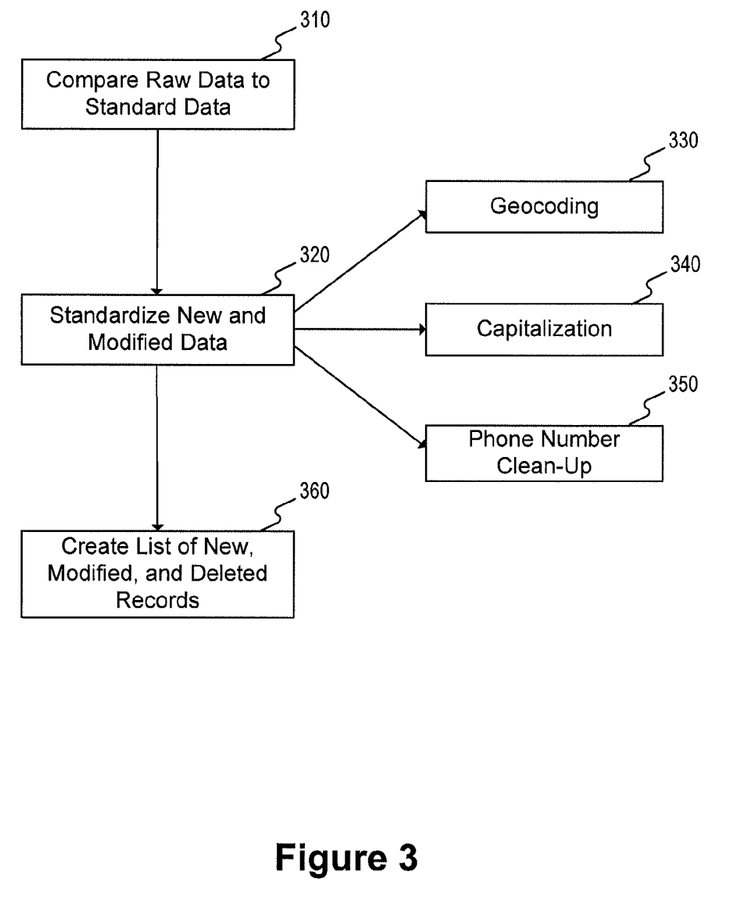
FIG. 3 is a flow diagram depicting exemplary steps of a second process for ingesting data, in accordance with an embodiment of the present disclosure.

FIG. 3 depicts an exemplary flow of a second process for data ingestion, in accordance with an embodiment of the present disclosure. The steps associated with this exemplary process may be performed by the components of FIG. 1. For example, the steps associated with the second process may be performed by raw data server 140, raw database 145, processing engine 150, standard data server 160, and/or standard database 165.

New point of interest data stored in a raw feed table (e.g., in step 240) and point of interest data previously stored in a standard table are accessed. In step 310, the raw feed table is compared to the standard table for that feed to identify new records (i.e., new points of interest), deleted records, and modified records. In one embodiment, the standard table may be stored in standard database 165. Alternately, raw feed table and standard table may both be stored in the same database. For example, raw feed table and standard table may be stored in a database dedicated to storing data for a particular data feed. In this embodiment, each data feed may have its own database. Alternatively, raw feed tables and standard tables from multiple data feeds may be stored in the same database. The number of databases utilized to store feed data may vary, as appropriate, based on the quantity of data feeds, points of interest, and/or data points for each point of interest, among other factors.

Each record in the raw feed table that does not correspond to any point of interest represented in the standard table may be labeled a new record. Each record in the standard table that does not correspond to any point of interest represented in the raw feed table may be labeled as a deleted record and, thus, may be deleted from the standard table. Each record in the raw feed table that corresponds to a point of interest represented in the standard table, but which differs in some aspect from the record for that point of interest in the standard table, is labeled a modified record. In one embodiment, modified records are detected by comparing the hash codes associated with records in the raw feed table and standard table corresponding to the same point of interest.

Referring again to FIG. 3, each new or modified point of interest record in the raw feed table is standardized in step 320. Standardization may include, among other things, geocoding 330, capitalization 340, and phone number clean-up 350. Geocoding 330 may comprise submitting a point of interest record to a geocoder to convert geolocation information for a particular point of interest into a standard format. For example, geocoding 330 may involve converting abbreviated terms, such as ST, RD, and AVE, into their full forms, such as STREET, ROAD, and AVENUE. Geocoding 330 may also involve determining latitude and longitude information for a point of interest, for example, based on the address information provided for that point of interest in the raw feed table. The capitalization of records may be standardized in step 340. For example, each letter in each field associated with a new or modified record may be made upper-case or lower-case (i.e., all letters in a record may be made the same case). In one embodiment, capitalization may be adjusted for only a subset of data fields for new and modified records. Phone numbers may be cleaned up in step 350. For example, in one embodiment, dashes, parentheses, periods, or other symbols may be removed from phone numbers associated with new or modified records. In an alternative embodiment, one or more symbols, such as those listed above, may be added to one or more phone numbers associated with new or modified records to match an internal format. In yet another alternative embodiment, international codes and/or area codes may be added or deleted from phone number information, as appropriate. In another embodiment, alphabetic portions of phone numbers may be converted to their numerical equivalent. A list of new, modified, and deleted point of interest records is created at step 360, so that this information may be used in the third phase of data ingestion.

Figure 4:
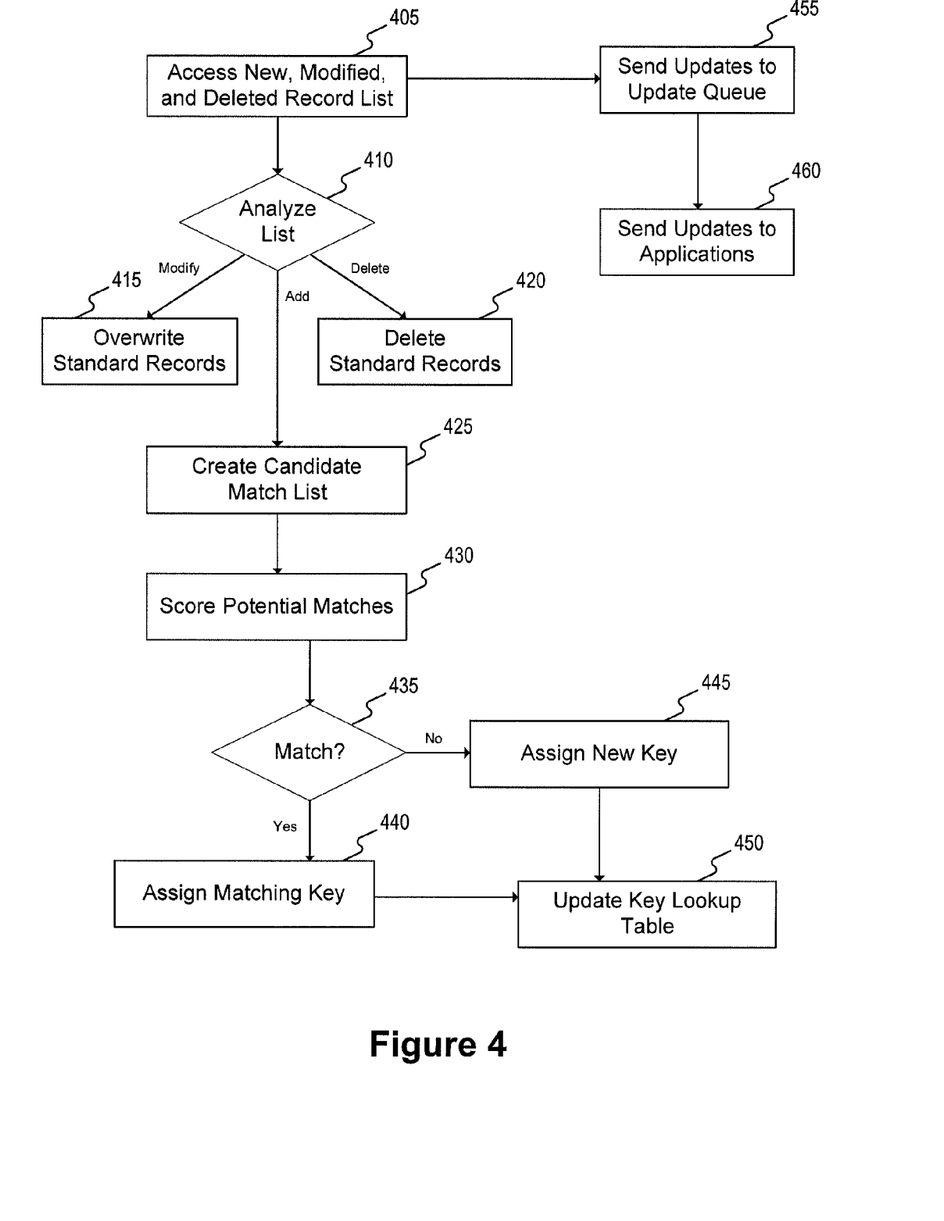
FIG. 4 is a flow diagram depicting exemplary steps of a third process for ingesting data, in accordance with an embodiment of the present disclosure.

FIG. 4 depicts an exemplary flow of a third process for data ingestion, in accordance with an embodiment of the present disclosure. The steps associated with this exemplary process may be performed by the components of FIG. 1. For example, the steps associated with the second process may be performed by raw data server 140, raw database 145, processing engine 150, standard data server 160, and/or standard database 165.

In step 405, the list of new, modified, and deleted records is accessed. The list is analyzed in step 410 to determine which are new records, which are modified records, and which are deleted records. Records in the raw feed table corresponding to modified point of interest data may overwrite records in the standard table corresponding to those same points of interest at step 415. In one embodiment, deleted points of interest are deleted from the standard table at step 420. In an alternate embodiment, deleted points of interest are deleted from the standard table as part of step 310 and prior to the creation of the record list in step 360.

Points of interest that are identified as new to the feed must be assigned a key, so that each point of interest may be uniquely identified throughout each of the feeds in the online web mapping service. To do so, it must first be determined whether any record exists for each new point of interest in any other feed. Accordingly, the standard tables corresponding to one or more other feeds are analyzed to create a list of candidate matches in step 425. For example, in one embodiment, the list of candidate matches may include records from other feeds likely to include similar points of interest (e.g., same point of interest type, same geographic location). In an alternate embodiment, the list of candidate matches may include all records from all other feeds.

In step 430, the new point of interest records are compared against the candidate matches. For example, the phone number stored for each new point of interest may be compared against the phone numbers stored for each of the candidate records. One of ordinary skill will appreciate from this disclosure that other fields whose values are most likely to be unique and substantially identical across feeds may be used to match new points of interest to candidate matches. For example, these may include an address, latitude/longitude coordinates, or combinations of different fields, such as point of interest name combined with city name.

In one embodiment, step 430 may include determining a score for each potentially matching record. The score may represent the degree of similarity between the new point of interest record and each potentially matching record and, thus, the likelihood that the new point of interest record corresponds to the same point of interest as each potentially matching record. Several different data fields may be analyzed to determine the score for each potential match. For example, the name, address, and telephone number fields of a new point of interest record may be compared with those fields in each potentially matching record. Exact matches for data from the same field may receive higher scores than inexact matches. In one embodiment, inexact matches may receive a score of zero. For example, a similar (but not identical) name may refer to the same point of interest, but a similar (but not identical) telephone number may be unlikely to refer to the same point of interest. In one embodiment, each field may be weighted, such that similarities between certain fields may be more significant to the overall score of the potential match than other fields.

The results of the comparison performed in step 430 are analyzed in step 435 to identify matches. For each match, the new point of interest is assigned the same key as the matching point of interest in step 440, as those records are presumed to refer to the same point of interest. For example, if the phone number for a record that is new to one feed matches the phone number of a records for a point of interest in another feed, the new record is assigned the same key as the matching point of interest record, as a phone number may be presumed to identify uniquely a point of interest. In one embodiment, if there are no matches identified using one point of comparison (e.g., phone number), another potentially unique field may be used to identify a potential match (e.g., address).

In embodiments where a scoring system is used, the potentially matching record with the highest score may be identified as a matching record. If multiple potentially matching records have the same score and each of these records has the same key, then that key may be used to identify the new point of interest record. If multiple potentially matching records have the same score but different keys, then the key that has records corresponding to the most feeds may be used.

If no matches are identified, a new key is generated in step 445 to identify the new point of interest within this feed, as well as across all other feeds. Accordingly, any records received for this point of interest from other feeds in the future may be assigned the same key. In step 450, a record is added (or modified) in a key lookup table to establish a link between the new point of interest record and any other (current or future) records for that point of interest across all feeds. For example, an entry may be added to the key lookup table that includes the point of interest key, as well as an identifier for the feed in which the point of interest information is stored. Thus, the key lookup table may be used to identify every record stored for a point of interest across all feeds. In other words, all current information for a point of interest may be accessed by searching the key lookup table for the appropriate point of interest key and then searching the listed feeds for records corresponding to that point of interest key.

The list of new, modified, and deleted point of interest records is sent to an update queue in step 455. In one embodiment, the update queue may list the point of interest key and a feed identifier. In an alternate embodiment, each updated record may be uploaded to the update queue in full from a standard table. This update queue may be used by internal and external applications to determine when their point of interest information needs to be updated. In one embodiment, an application may subscribe to the update queue (or an application associated with the update queue), so that it may be notified of updates to point of interest information as soon as updates are processed. In another embodiment, an application may check the update queue periodically (e.g., hourly, daily, monthly) to determine if any updates have been made that impact its point of interest information.

Updated records may be sent to requesting applications in step 460. The updated records may be sent using one of several export formats, such as CSV, XML, or other database load formats, such as MySQL and Postgres. In embodiments wherein complete point of interest records are loaded into the update queue, an export (i.e., load) file may be created based on the contents of the update queue and sent to the requesting applications. If embodiments wherein only point of interest keys and feed identifiers are stored in the update queue, an export file may be created based on the records stored in the standard table or tables for the updated points of interest.

Figure 5:
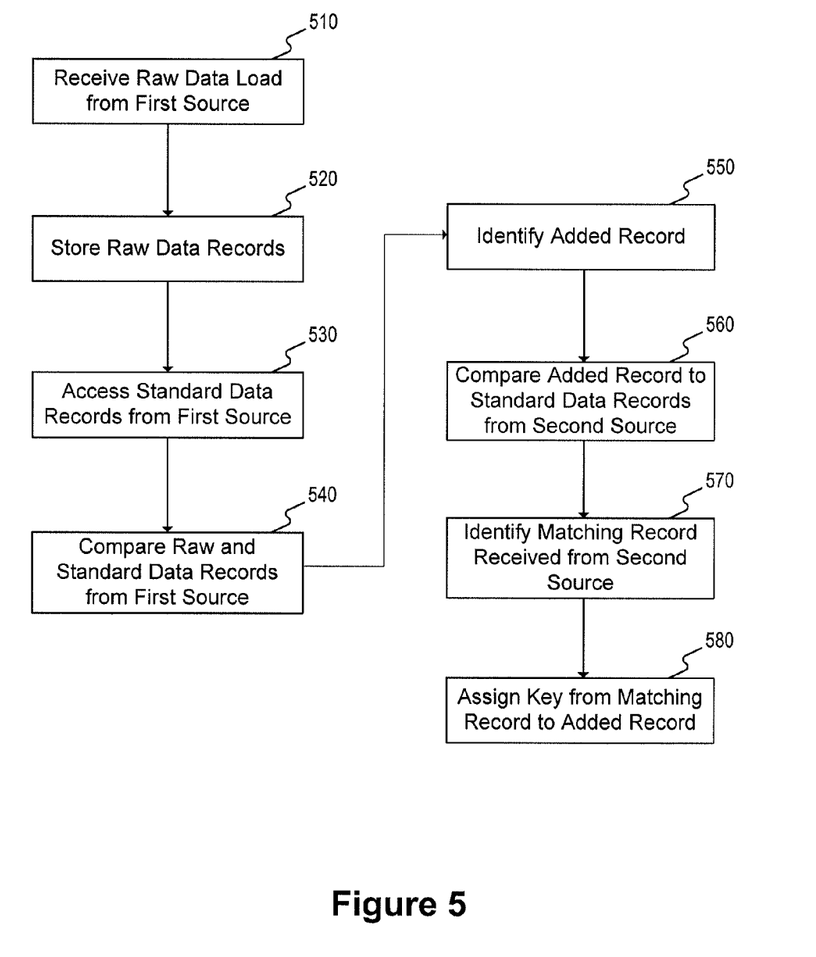
FIG. 5 is a flow diagram depicting another exemplary process, in accordance with an embodiment of the present disclosure.

FIG. 5 depicts an exemplary flow of another process for ingesting data, in accordance with an embodiment of the present disclosure. The steps associated with this exemplary process may be performed by the components of FIG. 1. In the following description, reference is made to certain components of FIG. 1 for purposes of illustration. It will be appreciated, however, that other implementations are possible and that components other than that illustrated in FIG. 1 may be utilized to implement the exemplary method of FIG. 5.

In step 510, a raw data load transmitted over a network is received from a first data source. In one embodiment, the raw data load is received by raw data server 140. The raw data load may comprise a plurality of raw data records. According to certain embodiments, the raw data load may include point of interest data. In these embodiments, each record in the plurality of raw data records may contain information pertaining to a unique point of interest. The plurality of raw data records may be stored in a first database, such as raw database 145, in step 520.

A first plurality of standard data records previously received from the first data source may be accessed in step 530. In step 540, a first comparison of data records is performed. In one embodiment, the first comparison of data records may be performed by processing engine 150. This first comparison may include comparing each of the plurality of raw data records to each of the first plurality of standard data records. In one embodiment, a hash code (e.g., an MD5 hash code) may be generated for each of the plurality of raw data records and stored in the first database along with each of those records. Further, in certain embodiments, a hash code assigned to each of the first plurality of standard data records may be accessed and compared to the hash code assigned to each of the raw data records. The results of the first comparison may be used at step 550 to identify at least one added record.

In one embodiment, the at least one added record may be standardized. For example, the at least one added record may be geocoded. As another example, the capitalization of the at least one added record may be adjusted. As yet another example, the punctuation of at least one added record may be removed. In one embodiment, standardization of data records may be performed by processing engine 150. Alternatively, standardization of data records may be performed by standard data server 160. Moreover, in one embodiment, the at least one added record is stored in the first database. In an alternate embodiment, the at least one added record is stored in a second database.

According to one embodiment, at least one modified record may be identified based on the first comparison. In this embodiment, at least one of the first plurality of standard data records may be overwritten with the at least one modified record. According to another embodiment, at least one deleted record may be identified based on the first comparison. In this embodiment, the at least one deleted record may be deleted from the first plurality of standard data records.

Referring again to FIG. 5, a second comparison of data records is performed in step 560. The second comparison may include comparing the at least one added record to each of a second plurality of standard data records received from a second data source. In one embodiment, the second comparison may include comparing at least one standardized field from the at least one added record to at least one corresponding standardized field from each of the second plurality of standard data records.

In step 570, a matching record received from the second data source may be identified based on the second comparison. In one embodiment, identifying the matching record may include determining a score representing the similarity between the at least one added record and each of the second plurality of standard data records and designating the standard data record having the highest score among all of the second plurality of standard data records as the matching record. In another embodiment, determining the score may include determining a score representing the similarity of at least one standardized field from at least one added record and at least one corresponding standardized field from each of the second plurality of standard data records. In yet another embodiment, determining the score may include determining a score representing the similarity of at least two standardized fields from the at least one added record and at least two corresponding standardized fields from each of the second plurality of standard data records. According to one embodiment, the score may reflect different weights assigned to similarities between each of the at least two standardized fields and each of the at least two corresponding standardized fields. In one embodiment, the second comparison and matching are performed by processing engine 150.

A key from the matching record may be assigned to the at least one added record at step 580. In one embodiment, the key may be stored in conjunction with the at least one added record in the first database. Moreover, according to certain embodiments, a link may be established between the matching record and the at least one added record. For example, a database entry may be created comprising the key, an identifier for the first data source, and an identifier for the second data source, and this entry may be stored in the first database. Alternately, this entry may be stored in the second database or another database, as appropriate.

In one embodiment, at least one application may be notified of the added record. The at least one application may also be notified of any modified or deleted records. According to one embodiment, notifying the at least one added record may include sending the at least one added record to an update queue, receiving a request for an update from the at least one application, and sending the at least one added record from the update queue to the at least one application.

The exemplary embodiments of the present disclosure may be further understood by reference to the following example. Assume an online web mapping service receives point of interest data from three vendors: vendor A, vendor B, and vendor C. Different vendors may submit this data with different frequency. For example, vendor A may submit one point of interest data load per week, whereas vendors B and C may submit one data load per day. Moreover, each data load submitted by a vendor may correspond to different points of interest.

Continuing with the above example, assume each vendor is associated with a data feed. Thus, if there are three vendors who submit point of interest data to the mapping service, there are three feeds that provide point of interest data for that mapping service. Each load received by a vendor may be received at a server, such as raw data server 140. The load may be transmitted to the server in CSV, XML, or another format appropriate for loading data into a database. As an example of a data transmitted in CSV format, raw data server 140 may receive a data load from vendor A, in which one data record appears as follows: John's Pizza, 123 Main St., (123) 456-7890. In one embodiment, each received data load may be pre-processed to convert the data load into an internal format. Moreover, each record may also be processed through a hash function (e.g., the MD5 hash function) to create a hash code for the record. The pre-processing and/or hashing may be performed by either raw data server 140 or processing engine 150. Each raw data record is stored, along with its code, in a database, such as raw database 145.

The mapping service next determines whether the records in the new data load represent new point of interests, modified point of interest, or deleted point of interest with respect to the information previously received by the same vendor. Thus, the above exemplary record received from vendor A may be compared to each of the records previously received from vendor A. These previously received records may be stored in a standard table, which may be stored in standard database 165. In one embodiment, raw data and standardized data may be stored in two separate tables within the same database. If no record in the standard table for vendor A corresponds to John's Pizza, then John's Pizza is a new point of interest for vendor A. If a record exists in the standard table for vendor A for John's Pizza, but the hash code for that record is different from the hash code computed for the record for John's Pizza received in the most recent load, then the most recently received record represents modified point of interest information. Moreover, any records stored in the standard table for vendor A but not in the most recent data load from vendor A correspond to deleted points of interest (with respect to vendor A).

New and modified records may be standardized and stored in the standard table for vendor A. Standardization of records may facilitate more reliable comparison of records. As discussed above, standardization may include geocoding, adjusting capitalization, and removing punctuation (e.g., phone cleanup). For example, if geocoding is applied to the record for John's Pizza discussed above, 123 Main St. may be reformatted to read 123 Main Street. Moreover, geocoding may provide the latitude and longitude coordinates for John's Pizza. Moreover, each of the letters in the record for John's Pizza may be made lower case. Further, punctuation and/or symbols may be removed from the phone number, such that the phone number for John's Pizza reads 1234567890. This may allow for differently formatted numbers (e.g., (123) 456-7890, 123-456-7890, 123.456.7890) to return as matches if they indeed refer to the same number. Whereas new records are simply added to the standard table after standardization, modified records may overwrite the previously stored records for the corresponding points of interest in the standard table.

If no record stored in the standard table for vendor A corresponds to John's Pizza, and thus John's Pizza is determined to be a new point of interest for vendor A, then this new record for John's Pizza is compared to records stored in the standard tables corresponding to records received from vendors B and C to determine if either vendor B or vendor C has submitted information pertaining to John's Pizza. This comparison may be performed based on one field. For example, the phone number for John's Pizza may be compared against all phone numbers stored for points of interest in the standard tables corresponding to records received for vendors B and C. Alternatively, multiple fields may be compared and a score determined for each potentially matching record stored in the standard tables for vendors B and C. For example, the name "John's Pizza" may be compared to the name of each point of interest stored in the standard tables for vendors B and C. The address of John's Pizza may also be compared to each address stored in the standard tables for vendors B and C. An exact match of a field may receive a higher score than a close match. For example, 123 Main Street would receive a higher score than 123 Main Road. Moreover, different fields of comparison may be weighted differently, such that more important fields may contribute more significantly to the overall score for each potential match. The potentially matching record with the highest score is determined to be a matching record. If no potentially matching record has a score above a predefined threshold, then it is determined that there are no matching records (i.e., no vendor has previously received information for John's Pizza). This matching may be performed by either processing engine 150, or standard data server 160, for example.

After matching is performed, the new record received for John's Pizza is assigned a unique identifier or key. If a match was found, then the new record is assigned the same key as the matching record. This allows information received from multiple different sources for the same point of interest to be gathered easily. If no match was found, then a new key is generated and assigned to the new record. This new key may be assigned to future records corresponding to the point of interest received by other vendors. The key is stored in the standard table for the vendor that submitted the new record in conjunction with the standardized point of interest record for that point of interest. Further, the link between the point of interest and the vendor is established by storing the key for the point of interest and an identifier for the vendor in a record within a key lookup table. This table may store all relationships between points of interest and vendor feeds. For example, if vendor A and vendor C have both submitted information for John's Pizza, then a record in the key lookup table may include the key for John's Pizza, an identifier corresponding to vendor A, and an identifier corresponding to vendor C. The key lookup table may be stored in the standard database 165, in its own dedicated database, or in any other database, as appropriate.

In accordance with some embodiments, updated information may be pushed to applications that utilize the point of interest information using an update queue. The update queue may contain a list of all added, modified, and deleted records received from any vendor. Applications may subscribe to the update queue, such that they may be informed of updates to point of interest information that may impact their users. Applications may check the update queue periodically to determine whether an update to their information is necessary. If they need to perform an update, the applications may request that the appropriate updated information be sent to them.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Moreover, while embodiments of the present disclosure have been described with reference to the processing of point of interest data, embodiments of the present disclosure may be applied to process and ingest other types of data. Other implementations are also within the scope of the following exemplary claims.

Therefore, it is intended that the disclosed embodiments and examples be considered as exemplary only, with a true scope of the present disclosure being indicated by the following claims and their equivalents.

What is claimed is:

1. A computer-implemented method for ingesting data, the method comprising:
   receiving a raw data load transmitted over a network from a first data source, the raw data load comprising a plurality of raw data records;
   storing the plurality of raw data records in a first database;
   accessing a first plurality of standard data records previously received from the first data source;
   performing a first comparison, wherein the first comparison comprises comparing each of the plurality of raw data records to each of the first plurality of standard data records;
   based on the first comparison, identifying at least one added record;
   performing a second comparison, wherein the second comparison comprises comparing the at least one added record to each of a second plurality of standard data records received from a second data source;
   based on the second comparison, identifying a matching record received from the second data source; and
   assigning a key associated with the matching record to the at least one added record.

2. The computer-implemented method of claim 1, wherein the raw data load comprises point of interest data, and further wherein each of the plurality of raw data records relates to a unique point of interest.

3. The computer-implemented method of claim 1, further comprising: generating a hash code for each of the plurality of raw data records.

4. The computer-implemented method of claim 3, further comprising:
   storing the hash code generated for each of the plurality of raw data records in the database;
   accessing a hash code associated with each of the first plurality of standard data records previously received from the first data source; and
   comparing the hash code associated with each of the plurality of raw data records to the hash code associated with each of the first plurality of standard data records.

5. The computer-implemented method of claim 1, wherein the method further comprises standardizing the at least one added record.

6. The computer-implemented method of claim 1, wherein the method further comprises storing the at least one added record in at least one of the first database or a second database.

7. The computer-implemented method of claim 1, wherein comparing the at least one added record to each of a second plurality of standard data records received from a second data source comprises comparing at least one standardized field from the at least one added record to at least one corresponding standardized field from each of the second plurality of standard data records.

8. The computer-implemented method of claim 1, wherein identifying a matching record received from the second data source comprises:
determining a score representing the similarity between the at least one added record and each of the second plurality of standard data records; and
designating the standard data record having the highest score among all of the second plurality of standard data records as the matching record.

9. The computer-implemented method of claim 1, further comprising:
based on the first comparison, identifying at least one modified record; and
overwriting at least one of the first plurality of standard data records with the at least one modified record.

10. The computer-implemented method of claim 1, further comprising:
based on the first comparison, identifying at least one deleted record; and
removing the at least one deleted record from the first plurality of standard data records.

11. The computer-implemented method of claim 1, further comprising:
notifying at least one application of the added record.

12. The computer-implemented method of claim 11, wherein notifying the at least one application of the added record comprises:
sending the at least one added record to an update queue;
receiving a request for an update from the at least one application; and
sending the at least one added record from the update queue to the at least one application.

13. The computer-implemented method of claim 1, further comprising:
establishing a link between the matching record and the at least one added record.

14. The computer-implemented method of claim 13, wherein establishing a link between the matching record and the at least one added record comprises:
creating a database entry comprising the key, an identifier for the first data source, and an identifier for the second data source; and
storing the database entry in the first database.

15. A system for ingesting data, the system comprising:
a database; and
at least one processor in communication with the database and configured to:
receive a raw data load transmitted over a network from a first data source, the raw data load comprising a plurality of raw data records;
store the plurality of raw data records in the database;
access a first plurality of standard data records previously received from the first data source;
perform a first comparison, wherein the first comparison comprises comparing each of the plurality of raw data records to each of the first plurality of standard data records;
based on the first comparison, identify at least one added record;
perform a second comparison, wherein the second comparison comprises comparing the at least one added record to each of a second plurality of standard data records received from a second data source;
based on the second comparison, identify a matching record received from the second data source; and
assign a key associated with the matching record to the at least one added record.

16. The system of claim 15, wherein the raw data load comprises point of interest data, and further wherein each of the plurality of raw data records relates to a unique point of interest.

17. The system of claim 15, wherein the at least one processor is further adapted to:
generate a hash code for each of the plurality of raw data records.

18. The system of claim 17, wherein the at least one processor is further adapted to:
store the hash code generated for each of the plurality of raw data records in the database;
access a hash code associated with each of the first plurality of standard data records previously received from the first data source; and
compare the hash code associated with each of the plurality of raw data records to the hash code associated with each of the first plurality of standard data records.

19. The system of claim 15, wherein the at least one processor is further adapted to standardize the at least one added record.

20. The system of claim 19, wherein to standardize the at least one added record, the at least one processor is further adapted to perform at least one of:
geocoding the at least one added record;
adjusting the capitalization of the at least one added record; and
removing punctuation from the at least one added record.

21. The system of claim 15, wherein to identify a matching record received from the second data source, the at least one processor is further adapted to:
determine a score representing the similarity between the at least one added record and each of the second plurality of standard data records; and
designate the standard data record having the highest score among all of the second plurality of standard data records as the matching record.

22. The system of claim 21, wherein to determine a score representing the similarity between the at least one added record and each of the second plurality of standard data records, the at least one processor is further adapted to:
determine a score representing the similarity of at least one standardized field from the at least one added record and at least one corresponding standardized field from each of the second plurality of standard data records.

23. The system of claim 21, wherein to determine a score representing the similarity between the at least one added record and each of the second plurality of standard data records, the at least one processor is further adapted to determine a score representing the similarity of at least two standardized fields from the at least one added record and at least two corresponding standardized fields from each of the second plurality of standard data records, and further wherein the score reflects different weights assigned to similarities between each of the at least two standardized fields and each of the at least two corresponding standardized fields.

24. A computer-readable storage medium that comprises a set of instructions that are executable by at least one processor to cause the at least one processor to perform a method for ingesting data, the method comprising:

receiving a raw data load transmitted over a network from a first data source, the raw data load comprising a plurality of raw data records;

storing the plurality of raw data records in a first database;

accessing a first plurality of standard data records previously received from the first data source;

performing a first comparison, wherein the first comparison comprises comparing each of the plurality of raw data records to each of the first plurality of standard data records;

based on the first comparison, identifying at least one added record;

performing a second comparison, wherein the second comparison comprises comparing the at least one added record to each of a second plurality of standard data records received from a second data source;

based on the second comparison, identifying a matching record received from the second data source; and assigning a key associated with the matching record to the at least one added record.

25. The computer-readable storage medium of claim 24, wherein the raw data load comprises point of interest data, and further wherein each of the plurality of raw data records relates to a unique point of interest.

26. The computer-readable storage medium of claim 24, wherein the method further comprises generating a hash code for each of the plurality of raw data records.

27. The computer-readable storage medium of claim 26, wherein the method further comprises:

storing the hash code generated for each of the plurality of raw data records in the database;

accessing a hash code associated with each of the first plurality of standard data records previously received from the first data source; and comparing the hash code associated with each of the plurality of raw data records to the hash code associated with each of the first plurality of standard data records.

\* \* \* \* \*